Figure 1A:
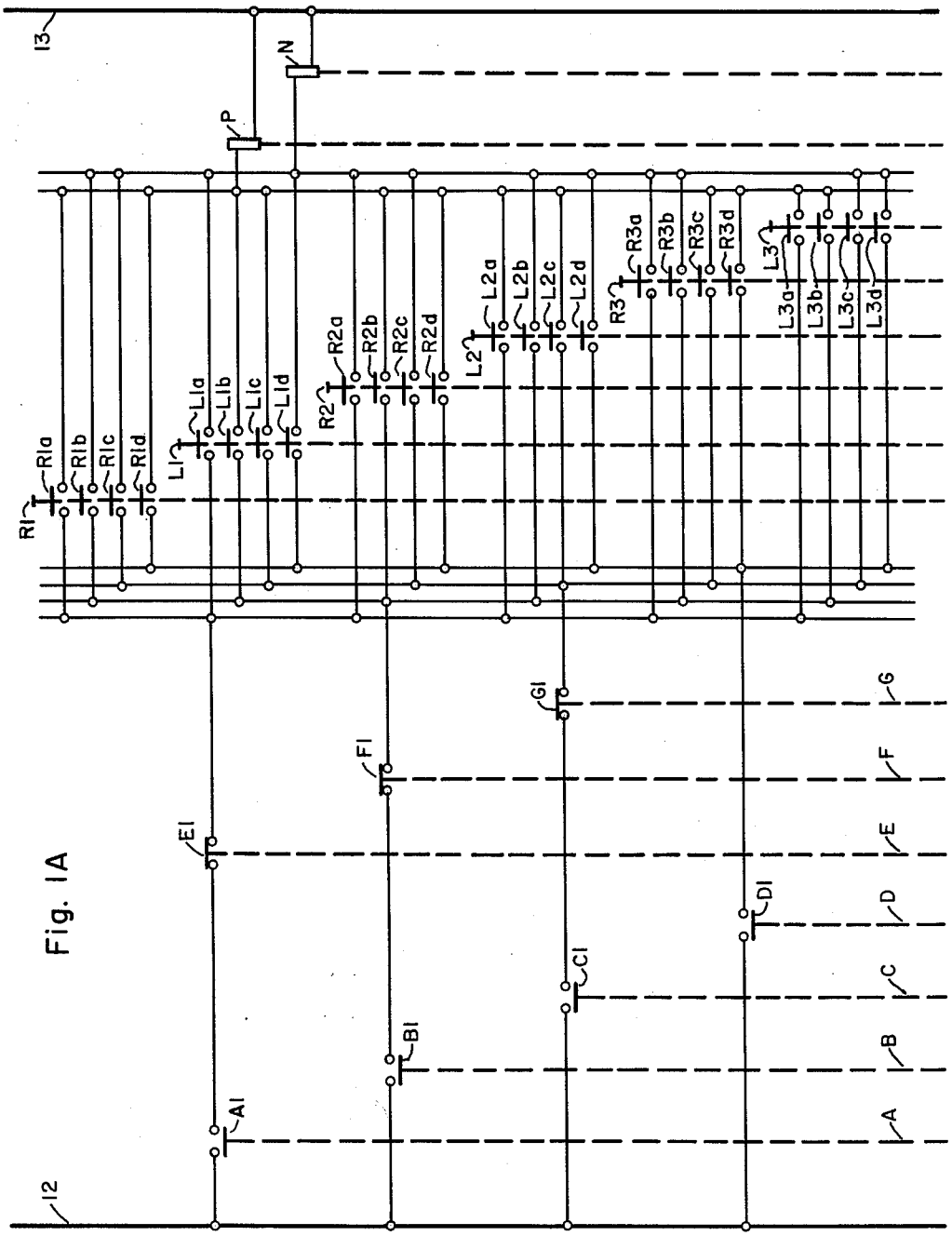

March 3, 1964  W. A. DERR ETAL  3,123,805
REMOTE CONTROL SYSTEM
Original Filed Oct. 14, 1954  5 Sheets-Sheet 1

WITNESSES
INVENTORS
Willard A. Derr and
William F. Cruess
BY
ATTORNEY

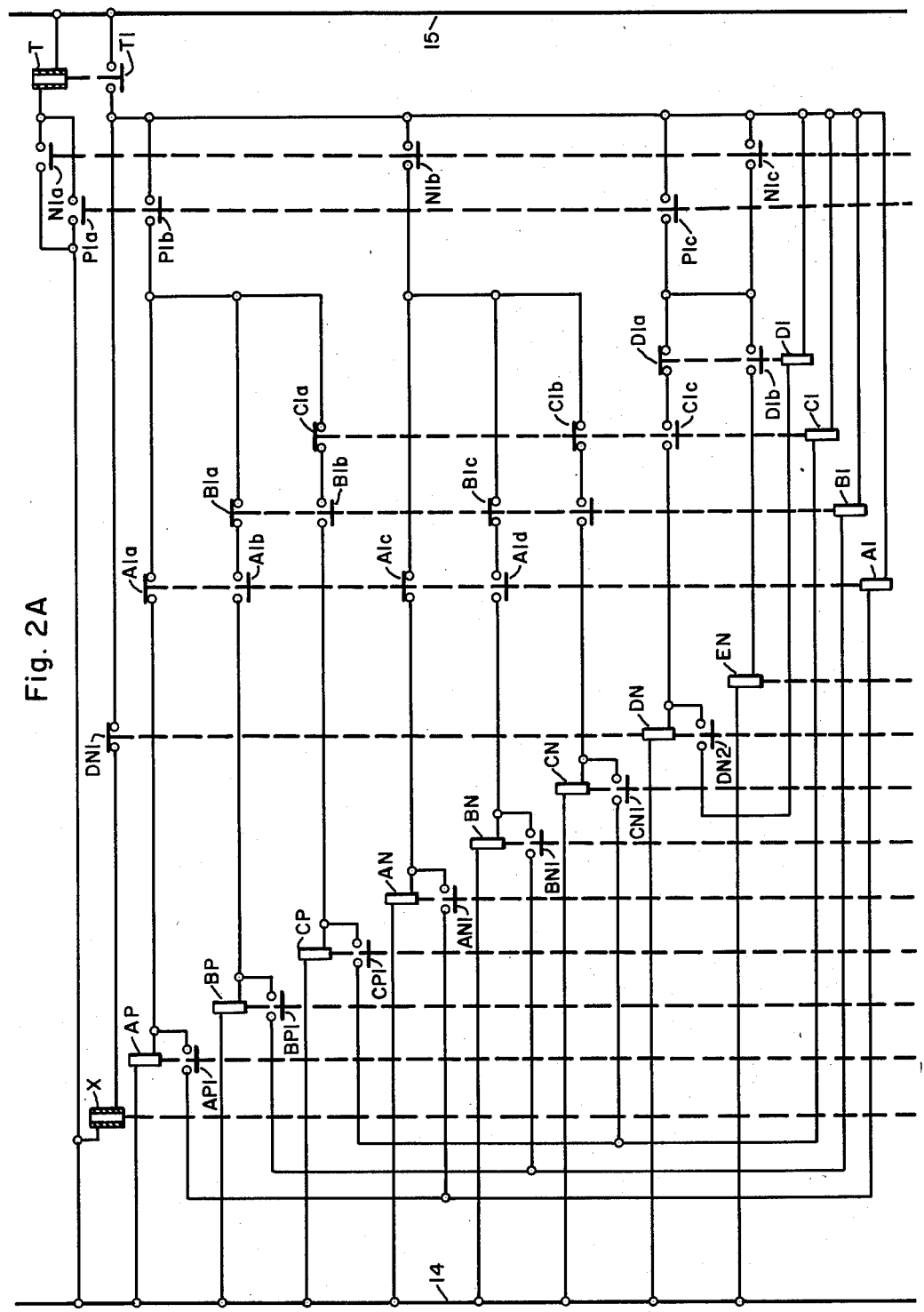

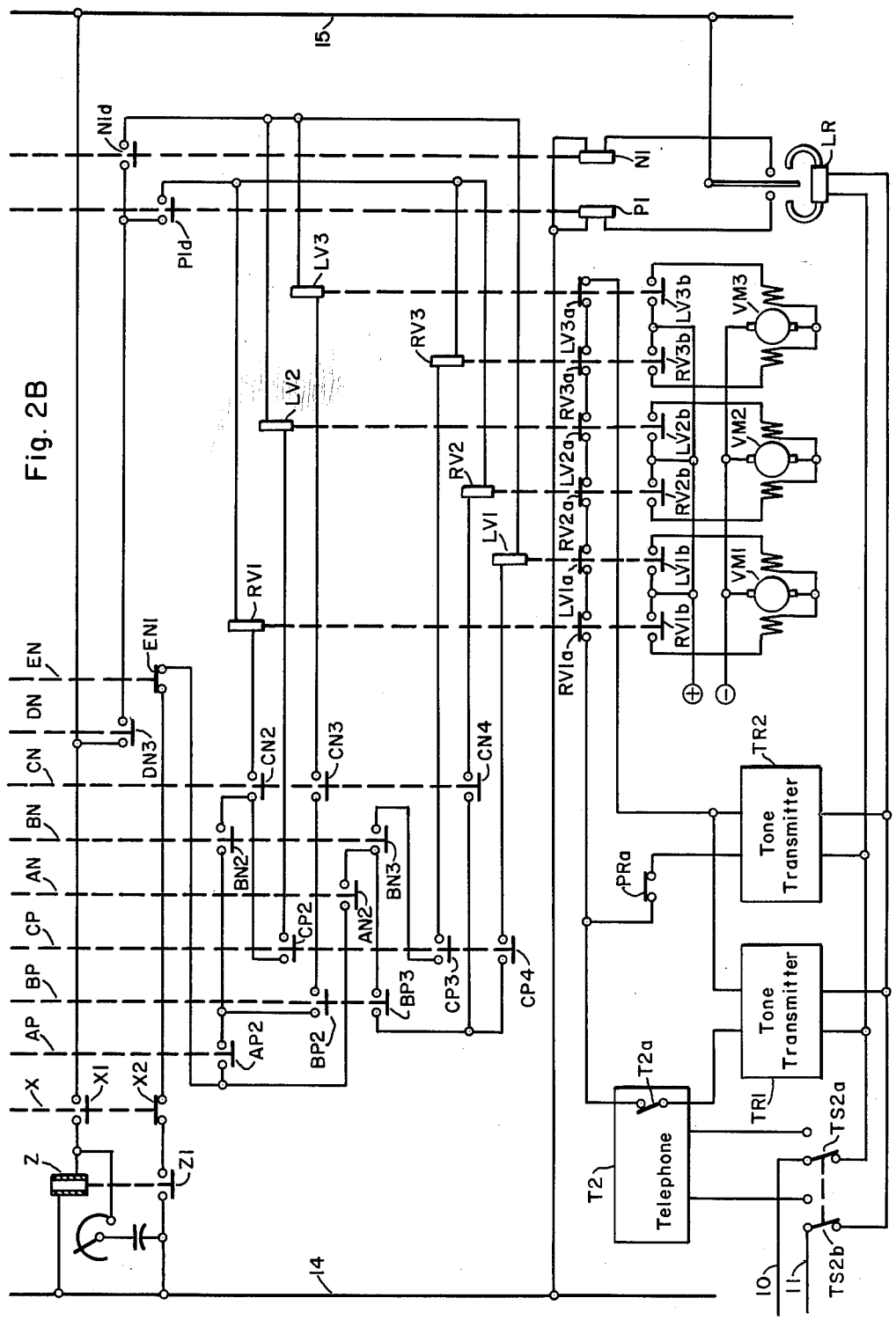

United States Patent Office 3,123,805
Patented Mar. 3, 1964

3,123,805
REMOTE CONTROL SYSTEM
Willard A. Derr, Wilkinsburg, and William F. Cruess,
Penn Township, Allegheny County, Pa., assignors to
Westinghouse Electric Corporation, East Pittsburgh,
Pa., a corporation of Pennsylvania
Continuation of application Ser. No. 462,355, Oct. 14,
1954. This application Apr. 3, 1959, Ser. No. 803,896
9 Claims. (Cl. 340—147)

Our invention relates generally to remote control, and it has reference, in particular, to apparatus and a system for remote control of devices such as valves or the like.

This application is a continuation of application Serial No. 462,355, filed October 14, 1954, and now abandoned.

Generally stated, it is an object of our invention to provide in a simple and inexpensive manner, for remotely controlling a plurality of valves or the like.

More specifically, it is an object of our invention to provide a control system of the self-checking type wherein but a single operation is required for effecting a particular operation of a particular device.

Another object of our invention is to provide in a self-checking remote control system for transmitting, an operating code for directly operating a remotely located device and obtaining a check on the operation thereof.

Yet another object of our invention is to provide in a remote control system for using a self-checking operating code for operating a remotely located device and for obtaining a check on the operation of the device by means of tone signals which also function to provide supervision of the signal channel.

It is also an object of our invention to provide for using a self-checking type of code in a remote control system so that only a single operation is required for directly operating remotely located devices, and for limiting the duration of such operation to a predetermined interval of time.

It is an important object of our invention to provide in a remote control system for using a self-checking operating code for effecting operation of a particular remote device, and for using two continuous signals of different frequencies, both of which are interrupted upon operation of the device and one of which is interrupted by telephone apparatus operating over the same signal channel for obtaining both supervision of the signal channel and indications of the operating condition of both the telephone and remote devices.

Yet another important object of our invention is to provide in a remote control system for preventing completion of a circuit to any of the interposing relays which control operation of a plurality of remotely located valves, until the termination of the operating code.

Other objects will, in part, be obvious, and will, in part, be explained hereinafter.

In practicing our invention, in accordance with one of its embodiments, control of a plurality of valves or other motor operated devices at a remote station is effected by using at a remotely located dispatching office a plurality of counting relays, and operating switches for connecting the counting relays so as to require only a single operation to effect operation of a pair of sending relays to produce operating codes of a self-checking type, comprising a different sequence of positive and negative pulses for each switch. Receiving relays at the remote station, selectively responsive to such different coded arrangements of pulses, operate different ones of pairs of counting relays depending on the particular sequence of pulses, so as to connect an interposing relay for opening or closing a particular valve, depending on which switch is operated at the dispatching office.

Figure 1B:
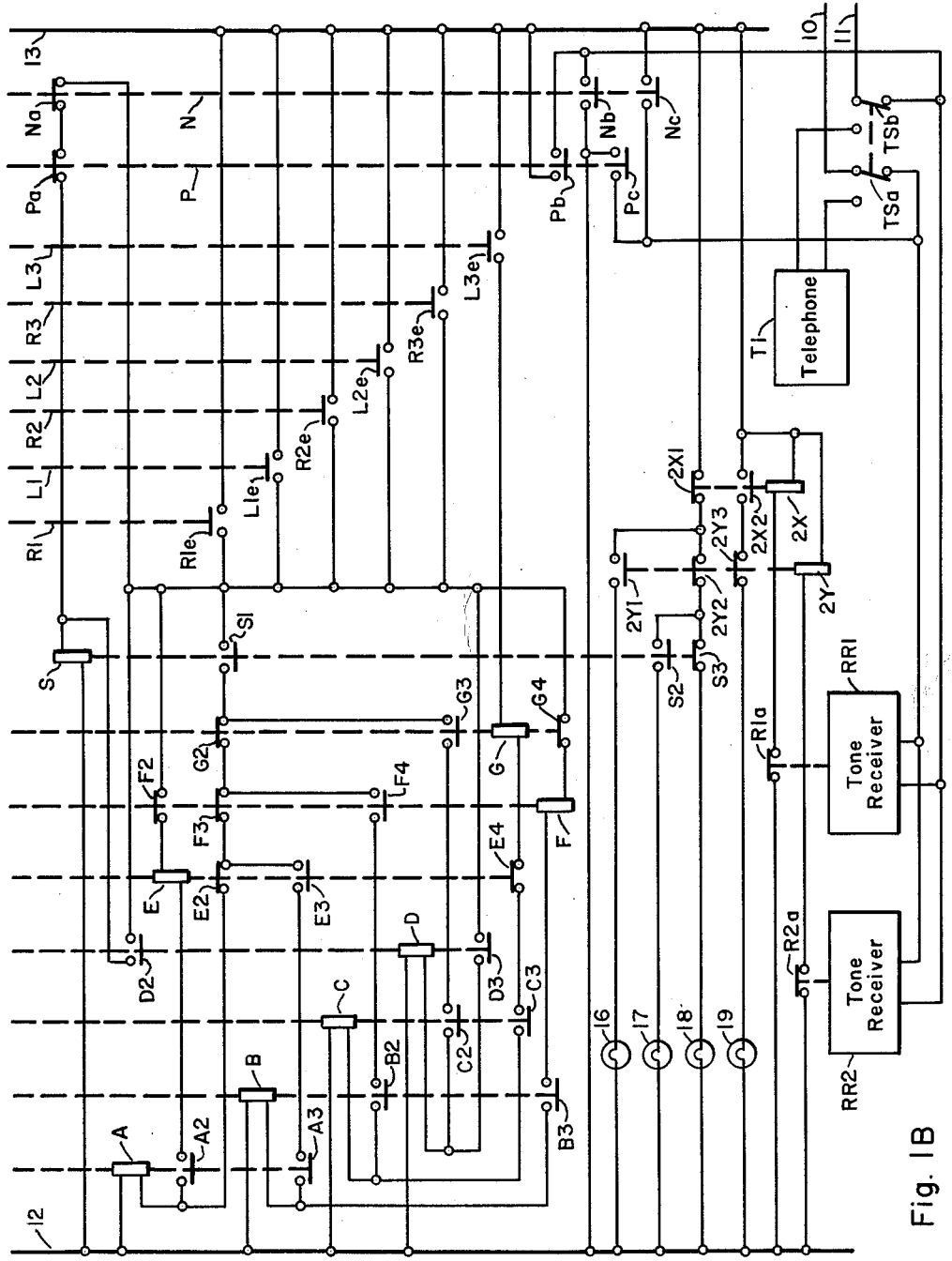
Figure 3:
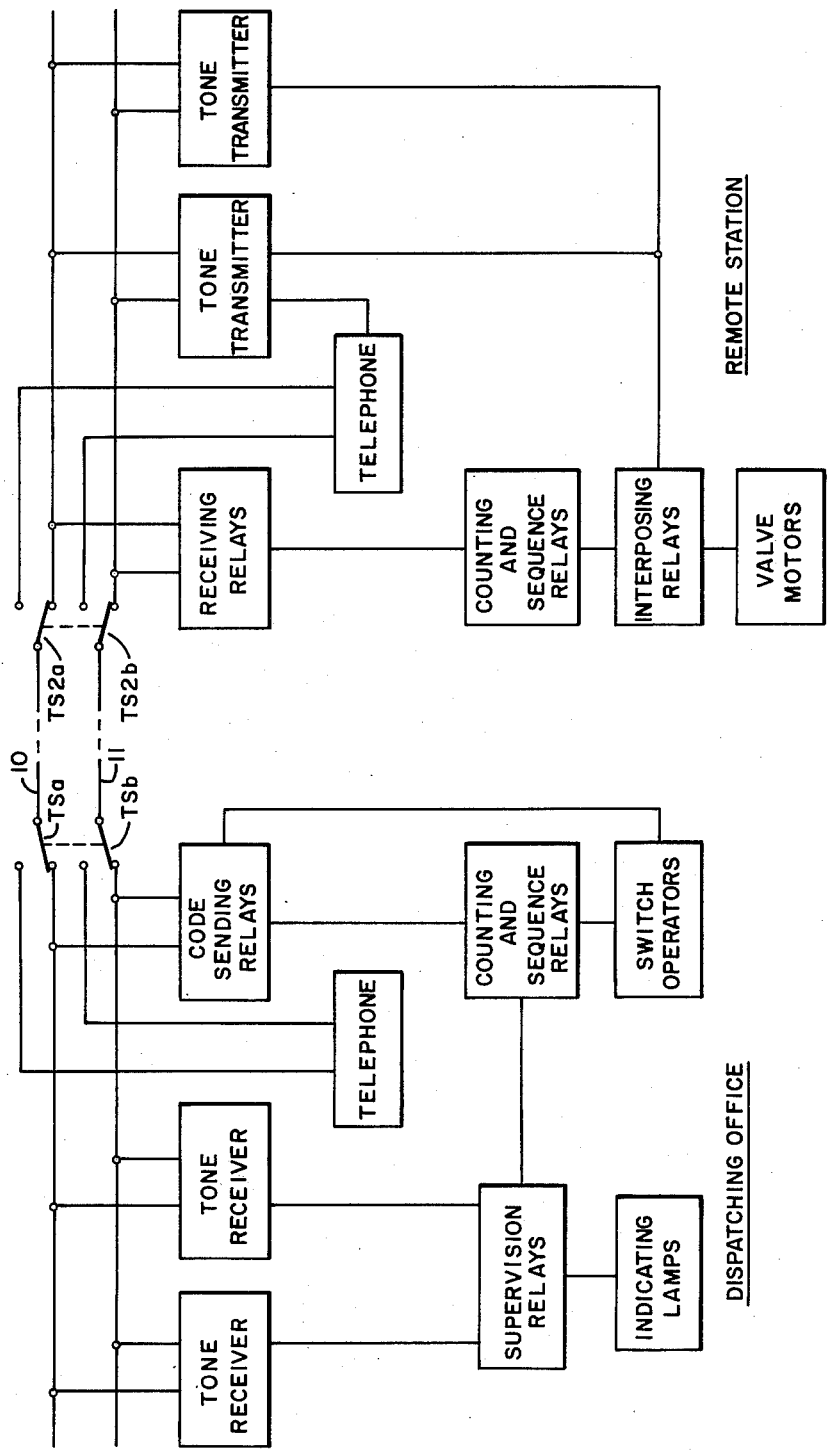

For a more complete understanding of the nature and the scope of our invention, reference may be made to the following detailed description which may be read in connection with the accompanying drawings, in which:

FIGURES 1A and 1B, disposed one above the other, comprise a schematic diagram of the control and supervision equipment at a dispatching office;

FIGS. 2A and 2B, disposed one above the other, comprise a schematic diagram of the control apparatus at a remote station for controlling the operation of a plurality of valves; and FIG. 3 comprises a complete system block diagram showing the control and supervision equipment at the dispatching office and the valve control apparatus at the remote station.

Referring particularly to FIGS. 1A and 1B, it will be seen that a pair of sending relays P and N are disposed to reversibly connect the conductors 10 and 11 of a signal channel connecting a dispatching office to a remote station, to conductors 12 and 13 which are of positive and negative polarity, respectively. Operation of the sending relays is controlled by means of a plurality of counting relays A, B, C and D for sending operating codes comprising in the present instance a total of four pulses. Sequence relays E, F and G are used in conjunction with the counting relays A, B, C and D for effecting sequential operation thereof. A pulsing relay S is provided for connecting the counting relays to the conductors 12 and 13 for effecting operation thereof. In order to permit operation of remotely located apparatus by sending an operating code directly, without first requiring the sending of a selection code, thus requiring only a single operation by the operator, a plurality of operating switches R1, L1, R2, L2, R3 and L3 are provided for connecting the counting relays to initiate operation thereof and for so connecting the sending relays P and N as to produce different arrangements of positive and negative pulses for each of the switches, each arrangement comprising a total of four pulses and consisting of two negative and two positive pulses.

Referring to FIGS. 2A and 2B, it will be seen that a polarized receiving relay LR is connected to the signal channel for selectively responding to pulses of opposite polarities and controlling a pair of receiving relays P1 and N1 to effect operation thereof in a sequence corresponding to the sequence of positive and negative pulses transmitted from the dispatching office. The receiving relays P1 and N1 selectively control the operation of pairs of counting relays comprising a set of positive counting relays AP, BP and CP, and a set of negative counting relays AN, BN and CN. The counting relays set up control circuits for selectively operating one of a plurality of interposing relays RV1, LV1, RV2, LV2, RV3 and LV3 depending on the sequence of their operation. These interposing relays selectively control the operation of valve motors VM1, VM2 and VM3 for operating them in different directions to raise or lower different ones of a plurality of valves.

In order to permit the last pulse of an operating code to be held on, an additional counting relay DN is provided for operating in response to either positive or negative pulses for completing the connection of interposing relays for the valves to be controlled. An additional counting relay EN is provided for operating in response to an excess of control pulses, either positive or negative, for preventing operation of the equipment. An auxiliary slow-release relay T is provided which remains operated between pulses and drops upon the termination of a chain of pulses so as to reset the counting relays and prevent operation of the valve devices in the event that less than the predetermined number of pulses are received. An additional slow release relay X is provided for holding the operating circuits for any of the interposing relays RV1, LV1, RV2, LV2, RV3 and LV3 open, until the completion of the operating code. A time delay relay Z is provided which maintains the operating circuit for any of the interposing relays for only a predetermined time after the transmission of the operating code, so as to prevent excessive operation of any valve due to the operator holding the operating key down too long.

Telephone apparatus T2 is provided at the remote station and is disposed to be connected to the signal channel conductors 10 and 11 by means of a transfer switch having movable contacts TS2a and TS2b. Corresponding telephone equipment T1 at the dispatching office is connected to the signal channel through a transfer switch having movable contacts TSa and TSb. In order to provide for supervision of the signal channel as well as the operating condition of the telephone equipment and the valve devices, transmitters TR1 and TR2 are provided at the remote station for connection to the signal channel to provide tone signals of different frequencies. Normally closed contacts of the interposing relays RV1 through LV3 are connected to inactivate the transmitters TR2 and TR1 in the event that any one of the interposing relays is in the operated position. A switch T2a, which opens when the telephone equipment at the remote station is in use, is also connected in the operating circuit of the transmitter TR1 and the contacts PRa of a power relay, which opens when alternating current power used to provide the normal source of energy for the direct current buses 14 and 15 at the remote station fails, are connected in the operating circuit of the transmitter TR2 (the remote station is provided with an emergency battery source of power [not shown] to which connection is made in any manner well known in the art, when the normal source fails).

At the dispatching office, receivers RR1 and RR2 are provided which are respectively responsive to the frequencies of the transmitters TR1 and TR2. Contacts R1a and R2a, which are held closed while signals are being received by the receivers, are connected in the operating circuits of supervision relays 2X and 2Y, which control the operating circuits for a telephone lamp 16, an operating check lamp 17, a line supervision lamp 18 and a power failure lamp 19.

If it is desired to raise or open the No. 1 valve, only switch R1 need be operated. This provides an operating circuit for the pulse relay S through a circuit including contacts R1e, Pa and Na. The pulse relay operates and provides an operating circuit for counting relay A through a circuit including contacts R1e, S1, G2, F3 and E2. Relay A operates and closes contacts A2 to set up an operating circuit for the sequence relay E. At the same time, the relay A completes an energizing circuit for the sending relay P through a circuit including the normally closed contacts E1, contacts A1 and contacts R1a. The sending relay P operates and connects the channel conductors 10 and 11, at contacts Pc and Pb, to conductors 12 and 13, respectively, so as to produce a positive pulse on the signal channel. Operation of sending relay P interrupts the energizing circuit for the pulse relay S at contact Pa, so that the pulse relay deenergizes. This opens contact S1, which removes a shunt from the sequence relay E, which thereupon is connected in series with the counting relay A. Operation of sequence relay E interrupts the energizing circuit for counting relay A at contact E2 and sets up an energizing circuit for counting relay B through contact E3. Deenergization of sending relay P again completes the energizing circuit for the pulse relay S through contact Pa, and relay S again operates, providing an energizing circuit for counting relay B through a circuit including contacts R1e, S1, G2, F3, E3 and A3. The operation of counting relay B provides an energizing circuit for the sending relay N through a circuit including contacts B1, F1, and R1b. The sending relay N operates and connects the signal channel conductors 10 and 11 reversely, at contacts Nc and Nb, to conductors 13 and 12, respectively, so as to transmit a negative pulse. This sequence of operation continues, with counting relays C and D operating in turn to effect further operation of sending relay N for the third pulse and operation of the sending relay P for the fourth pulse, thus transmitting on closing of switch R1, a code of four pulses comprising + − − +. Other codes for switches L1, R2, L2, R3 and L3 may be, for example, − + + −, − + − +, + − + −, − − + +, and + + − −, respectively.

Operation of counting relay D provides a holding circuit for the pulse relay S through contacts D2, so long as the switch R1 is operated.

It will be noted that each of the codes used consists of not only a total of four pulses, but also of two positive and two negative pulses. This enables the codes to be self-checking and permits directly operating remote apparatus without requiring the sending of separate selection and operating codes. Interference can have four possible effects on such codes, i.e. (1) one or more pulses may be lost; (2) one or more extra pulses may be received; (3) a negative pulse may be changed to positive; and (4) a positive pulse may be changed to negative. By making the equipment at the remote station sensitive to fewer than, as well as more than the number of impulses, the code is made substantially self-checking, since it is very unlikely that a positive pulse will be changed to negative, and a negative to positive in one chain of pulses.

At the remote station the receiving relay LR operates in response to the chain of four pulses to selectively operate the receiving relays P1 and N1 in a sequence corresponding to the sequence of positive and negative pulses. Thus, receiving relay P1 operates upon the first pulse and provides an energizing circuit through contact P1a for the auxiliary relay T. Auxiliary relay T provides an energizing circuit for the slow release relay X through a circuit including contact T1 and normally closed contact DN1. Relay X thereupon interrupts any possible energizing circuit for the interposing relays at contact X2. It also completes an energizing circuit for the time delay relay Z at contact X1. The auxiliary relay T sets up an operating circuit for the counting relays through contact T1, and counting relay AP is energized in response to the first pulse through a circuit including contact T1, contacts P1b and contact A1a. Relay AP operates and sets up an energizing circuit for sequence relay A1 through contact AP1. At the end of the first pulse the receiving relay LR deenergizes, dropping the receiving relay P1. The auxiliary relay T remains energized for a predetermined time, and sequence relay A1 is energized upon removal of the shunt circuit about it through the opening of contacts P1b. In the control circuit for the interposing relays, contact AP2 is closed and remains closed.

In response to the second pulse, which is negative, the receiving relay LR operates to energize relay N1. This provides a holding circuit for the auxiliary relay T through contact N1a, and provides an energizing circuit for counting relay BN through a circuit including contacts N1b, B1c and A1d. Relay AN remains deenergized because its operating circuit is interrupted at contacts A1c. Operation of counting relay BN completes an energizing circuit for the sequence relay B1 through contacts BN1, and sequence relay B1 operates in series with counting relay BN at the end of the second pulse when contact N1b, shunting the sequence relay, opens. Counting relays CN and DN are operated in sequence, relay CN being energized through a circuit including contacts N1b, C1b and B1d, and relay DN on the fourth pulse being operated in response to either positive or negative pulses, in this instance through the circuit including contacts P1c, D1a and C1c, relays C1 and D1 picking up in series with relays CN and DN, respectively. At the end of the chain of four pulses, relay T will be held energized as long as the fourth pulse continues. The slow release relay X is released a predetermined time after operation of relay DN by the opening of contacts DN1. When relay X opens, an energizing circuit is provided for the interposing relay RV1 through a circuit including contacts Z1, X2, EN1, AP2, BN2, CN2, P1d and DN3. The valve motor VM1 is thereby connected to operate in a direction to open or raise the No. 1 valve, and continues to operate for a predetermined time until the relay Z interrupts the energizing circuit at contact Z1.

Should more than four pulses be received at the remote station, relay EN operates in response to the fifth pulse, and interrupts the energizing circuit for any of the valve devices at contacts EN1. Should fewer than four pulses be received, the auxiliary relay T deenergizes and disconnects the counting relays from the source at contacts T1 so as to prevent any possible operation of a valve device.

With the control equipment at rest, transmitters TR1 and TR2 will both be transmitting their respective frequencies and receivers R1 and R2 will be energized, holding contacts R1a and R2a in the closed position as shown. This provides energizing circuits for the supervision relays 2X and 2Y so that all of the supervision lamps will be extinguished. Should one of the interposing relays be in the energized position, such as during operation of a valve motor, both of the transmitters will be deenergized and both of the contacts R1a and R2a will be open, thus deenergizing the supervision relays 2X and 2Y. Since the impulse relays S is energized under this operating condition, an energizing circuit for the check lamp 17 will be provided through contacts S2, 2Y2 and 2X1. Should it be desired to put the telephone equipment in operation at the remote station, the operator will open switch T2A and transmitter TR1 will be deenergized. This means that contact R1a will be open while contact R2a will be closed so that relay 2X will be deenergized while relay 2Y remains energized. An operating circuit for the telephone lamp is thereupon provided through contacts 2X1 and 2Y1. The operators at the remote station and dispatching office thereupon operate transfer switches TS2 and TS to connect the telephone equipment to the channel. Should there be a failure of the alternating current power source at the remote station, from which the station source of D.-C. power is derived, contact PRa opens, transmitter TR2 will be deenergized and relay 2X will be energized, while relay 2Y is deenergized. An operating circuit for the power failure lamp 19 is thus provided through contacts 2X2 and 2Y3. Should there be a fault or an open circuit on the signal channel the signals from both transmitters will be lost and relays 2X and 2Y will both be deenergized. If the equipment is not in use, the pulse relay S will be in a deenergized position and an operating circuit for the line supervision lamp 18 is provided through contacts 2X1, 2Y2 and S3.

From the above description and the accompanying drawings it will be apparent that we have provided a simple and effective manner for selectively effecting operation of a plurality of remotely located devices. The operator need only perform one operation to effect a particular operation of a particular device. By using a self-checking type of code comprising a predetermined total number of pulses, as well as a predetermined number of positive and negative pulses individually, the possible effects of interference, which may cause loss of either (1) a positive or (2) a negative pulse or the accidental change of (3) a positive or (4) a negative pulse to one of opposite polarity, cannot effect a pulse operation of the remotely located devices. Accordingly the operating code for a particular device may be sent directly, without requiring first the selection of the device. A check on the operation is provided through the supervision circuits which indicate that a device has or has not operated. Apparatus according to the embodiments of our invention provides a relatively simple and inexpensive remote control which is ideally suited for the operation of valves or the like, particularly where the operator is in a position to observe a change in the flow of a fluid in the line being controlled even though the valve is at a remote location. Since indications of valve positions can readily be obtained in any of a different number of suitable telemetering operations, the operator can at all times be adequately informed as to the position of the valve device. While positive and negative pulses have been utilized in the system herein disclosed, it is realized that any distinctively different signals such as pulses of two different frequencies may also be used to provide self-checking codes similar in nature.

Since certain changes may be made in the above-described construction and different embodiments of the invention may be made without departing from the spirit and scope thereof, it is intended that all the matter contained in the above description and shown in the drawings shall be considered as illustrative and not in a limiting sense.

We claim as our invention:

1. In a control system for apparatus units at a remote station, a plurality of operating relays one for each operation of each one of said apparatus units, a plurality of pairs of counting relays, a pair of receiving relays each operable in response to a distinctively different signal, said receiving relays being connected to operate a different relay of each pair of counting relays in a predetermined sequence determined by the sequence of receipt of said different signals in a code, circuit means including contacts of said pairs of counting relays connecting the operating relays to operate a particular one dependent on the sequence of operation of the counting relays, a pair of sending relays at a dispatching office for producing said distinctively different signals, and means including a plurality of counting relays and only a single operating switch at the dispatching office for each operation of each apparatus unit to be performed connecting the sending relays to effect operation thereof in a different sequence for each such switch to directly transmit an operating code by the operation of said switch.

2. In remote control and supervision apparatus for operating each one of a plurality of valves in opposite directions at a remote station from a dispatching office, a pair of sending relays at the dispatching office operable to send distinctively different signals, means including a plurality of counting relays and only a single operating switch for each direction of operation of each valve connecting the sending relays to operate them in different sequences for each such switch to transmit an operating code by the operation of said switch, a control relay at the remote station for each direction of operation of each valve, a plurality of pairs of counting relays connected to effect operation of a different control relay for each sequence of operation, means including a pair of receiving relays selectively responsive to a different one of said distinctive signals connected to effect operation of the pairs of counting relays in a predetermined sequence dependent on the sequence of operation of the sending relays at the dispatching office, a tone transmitter, contact means responsive to operation of any of the control relays for shutting down the tone transmitter, and indicating means at the dispatching office activated by the tone transmitter.

3. Control apparatus for controlling a plurality of pieces of apparatus comprising, a pair of sending relays for producing distinctively different signals, a plurality of counting relays having contact means, only one control switch for each piece of apparatus to be controlled, said switches having contacts, circuit means including contact means of the counting relays and contacts of only one of the switches connecting the sending relays to operate in different predetermined sequences for each control switch operated, a control relay having contact means, circuit means including the contact means of the control relay and other contact means of the counting relays connecting the counting relays to operate in sequence, circuit means including contacts of the control switches and contacts of the sending relays connecting the control relay to effect operation of the counting relays, circuit means responsive to the operation of the last counting relay to prevent the contacts of the sending relays from effecting operation of the control relay, whereby the operation of the last operated sending relay at the termination of the corresponding sequence may be sustained so long as the control switch controlling the sequence is held closed, and receiving means for responding to each different sequence of operation of the sending relays to initiate a different control operation corresponding to each sequence and to sustain the control operation so long as the last signal is sustained.

4. In a control apparatus: means for producing signals; only a single operating switch for each operation of a plurality of operations to be performed; circuit means responsive to a single continuous operation of any one switch to cause the signal producing means to provide a different signal code in accordance with the operated switch, said circuit means including means for maintaining the terminal signal of the code until the operation of the operated switch is terminated; and receiving means for responding to each different signal code to actuate a different control operation corresponding to each sequence and to continue the operation for a time relative to the duration of the last signal of the code.

5. In a control apparatus: means for producing signals; only a single operating switch for each operation of a plurality of operations to be performed; circuit means responsive to a single continuous operation of any one switch to cause the signal producing means to provide a different signal code in accordance with the operated switch; said circuit means including means for maintaining the terminal signal of the code until the operation of the operated switch is terminated; and receiving means for responding to each different signal code to actuate a different control operation corresponding to each sequence and to continue the operation until the control operation has continued for a predetermined time or until the last signal of the code is terminated, whichever occurs first.

6. In a control apparatus; means for producing distinctly different signals; only one operating switch for each operation of a plurality of operations to be performed; circuit means responsive to a single continuous operation of any one switch to cause the signal producing means to provide a different sequence of the different signals in accordance with the operated switch, said circuit means including means for maintaining the last signal of the sequence until the operation of the switch is terminated; and receiving means for responding to each different sequence of operation of the sending relays to actuate a different control operation corresponding to each sequence and to continue the operation for a time relative to the duration of the last signal of the sequence.

7. In a control system for controlling apparatus units at a remote substation from a dispatching office connected thereto by a single signal channel; sending means operable to apply signals of different characteristics to the channel; circuit means including only a single operating switch for each control point connected to effect selective operation of the sending means to produce different arrangements of a fixed number of each of said signals; receiving means at the remote substation selectively responsive to said signals; a control means at the substation individual to each operation to be performed; and circuit means including means selectively responsive to said different arrangements of signals for operating said individual control means upon receipt of the fixed number of each of said signals.

8. A control system for controlling apparatus units at a remote substation from a dispatching office comprising sending means operable to produce signals of two different characteristics; a counting means at the remote substation; circuit means including only a single operating switch individual to each apparatus unit connected to operate the sending means selectively to produce different combinations each consisting of the same predetermined number of each of said signals; and receiving means at the remote substation selectively responsive to said signals to control the counting means at the remote substation in accordance with the order and characteristic of said impulses; and circuit means responsive to operation of the counting means and the receiving means at the remote substation operable to operate the control relay corresponding to the received signal combination if the signal combination is comprised of said predetermined number of each of said signals.

9. In a control apparatus: sending means for producing signals of different characteristics; only one switch for each operation to be performed; circuit means responsive to a single continuous operation of any one switch to cause the signal producing means to provide a different sequence of a fixed number of each of said signals in accordance with the operated switch, said circuit means including means for maintaining the last signal of the sequence until the operation of the switch is terminated; and receiving means for responding to said signals to actuate a different control means corresponding to each sequence if the sequence is comprised of said fixed number of each of said signals and including means for continuing the operation for a time relative to the duration of the last signal of the sequence but not to exceed a predetermined time.

References Cited in the file of this patent

UNITED STATES PATENTS

| | | |
|---|---|---|
| 1,832,118 | Hershey | Nov. 17, 1931 |
| 1,960,779 | Hershey | May 29, 1934 |
| 1,972,941 | Lewis | Sept. 11, 1934 |
| 1,980,190 | Davis | Nov. 13, 1934 |
| 2,314,187 | Abbott | Mar. 16, 1943 |
| 2,444,243 | Breese | June 29, 1948 |
| 2,584,739 | Rees et al. | Feb. 5, 1952 |
| 2,600,729 | Boyer et al. | June 17, 1952 |
| 2,623,939 | Derr | Dec. 30, 1952 |
| 2,644,931 | Derr et al. | July 7, 1953 |
| 2,679,034 | Albrighton | May 18, 1954 |